(12) United States Patent
Dittmann et al.

(10) Patent No.: US 7,329,084 B2
(45) Date of Patent: Feb. 12, 2008

(54) TURBOMACHINE

(75) Inventors: Rolf Dittmann, Nussbaumen (CH); Jonas Hurter, Baden (CH); Robert Marmilic, Nussbaumen (CH); Pierre Meylan, Magglingen-Macolin (CH); Ernst Pauli, Zürich (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 10/830,028

(22) Filed: Apr. 23, 2004

(65) Prior Publication Data

US 2004/0228723 A1 Nov. 18, 2004

Related U.S. Application Data

(63) Continuation of application No. PCT/IB02/02884, filed on Jul. 22, 2002.

(30) Foreign Application Priority Data

Oct. 30, 2001 (CH) .................................... 1989/01

(51) Int. Cl.
*F01D 25/26* (2006.01)
*F01D 25/12* (2006.01)

(52) U.S. Cl. ........................ 415/1; 415/108; 415/175

(58) Field of Classification Search .................. 415/1, 415/108, 175, 176
See application file for complete search history.

(56) References Cited

U.S. PATENT DOCUMENTS

| | | | |
|---|---|---|---|
| 3,631,672 A | 1/1972 | Gentile et al. | 60/39.66 |
| 3,793,905 A | 2/1974 | Black et al. | 74/661 |
| 4,351,150 A | 9/1982 | Schulze | 60/226 R |
| 4,854,120 A | 8/1989 | Nelson et al. | 60/39.02 |
| 4,903,477 A | 2/1990 | Butt | 60/39.37 |
| 5,127,222 A | 7/1992 | Ream et al. | 60/204 |
| 5,388,960 A | 2/1995 | Suzuki et al. | 415/176 |
| 5,454,220 A | 10/1995 | Althaus et al. | 60/39.04 |
| 5,605,437 A | 2/1997 | Meylan | 415/175 |
| 5,782,076 A * | 7/1998 | Huber et al. | 60/782 |
| 5,967,743 A | 10/1999 | Meylan | 415/115 |
| 6,478,534 B2 * | 11/2002 | Bangert et al. | 415/1 |
| 6,599,083 B2 * | 7/2003 | Belzner et al. | 415/1 |
| 2001/0022933 A1 | 9/2001 | Bangert et al. | 415/1 |

FOREIGN PATENT DOCUMENTS

| | | |
|---|---|---|
| DE | 367 109 C | 1/1923 |
| DE | 507 129 C | 9/1930 |
| EP | 0 620 362 A1 | 10/1994 |
| EP | 0 638 727 A1 | 2/1995 |
| EP | 0 838 595 A2 | 4/1998 |
| WO | WO 00/11324 | 3/2000 |

* cited by examiner

*Primary Examiner*—Edward K. Look
*Assistant Examiner*—Nathan Wiehe
(74) *Attorney, Agent, or Firm*—Steptoe & Johnson LLP

(57) ABSTRACT

Suitable means for driving a flow are arranged in annular or ring-segment-shaped cavities that are formed in particular in multi-shell casings of turbomachines. Arranged inside the cavity are ejectors that are supplied via suitable means with a motive-fluid flow which in turn excites the flow, preferably a circumferential flow or a helical flow. The invention is suitable in particular for avoiding casing distortions when turbomachines are at rest.

19 Claims, 6 Drawing Sheets ary of the Invention

TURBOMACHINE

CROSS-REFERENCE TO RELATED APPLICATIONS

This application is a continuation of the U.S. National Stage designation of co-pending International Patent Application PCT/IB02/02884 filed Jul. 22, 2002, the entire content of which is expressly incorporated herein by reference thereto.

FIELD OF THE INVENTION

The present invention relates to a turbomachine and a method of operating such a turbomachine.

BACKGROUND OF THE INVENTION

The phenomenon of the "buckling" of the rotor and of the casing of turbomachines such as gas turbines and steam turbines is sufficiently known. It is caused by the large and high-mass structures of such machines having stored large quantities of heat after prolonged operation. During the cooling, a pronounced vertical thermal stratification occurs in the comparatively large flow passages, this thermal stratification leading to nonuniform temperature distributions in the static and the rotating components, which, on account of the different thermal expansions, results in a distortion of casing and rotor and in deviations from the rotationally symmetrical desired geometry. As a result, with the unavoidably small gap dimensions in modern turbomachines, jamming of the rotor in the casing occurs, which inhibits the start-up availability and in addition is capable of putting the mechanical integrity at risk. Shaft-turning systems or also "shaft-indexing" systems have therefore been disclosed, for example, by U.S. Pat. No. 3,793,905 or U.S. Pat. No. 4,854,120. In this case, the rotor of a turbomachine continues to be rotated at a certain speed after the shutdown. Here, as in the known shaft indexing, low speeds within the region of 1 rev/min and lower are preferred. On the one hand, this is sufficient in order to make the cooling of the rotor more uniform in the circumferential direction; on the other hand, the speed is low enough in order not to cause any pronounced axial flow through, for instance, the hot-gas path of a gas turbine with associated cold-air input and thermal shocks.

In the section subjected to high temperatures, modern gas turbines are often constructed with twin-shell casings. In this case, an annular space, to which cooling air or other coolant is often admitted during operation, is formed between an inner casing and an outer casing. A vertical thermal stratification which leads to distortion of the casings forms in the annular space without further measures after the gas turbine has been shut down.

DE 507 129 and WO 00/11324 propose to provide means in a twin-shell casing of a turbine in order to disturb the stable thermal stratification by a forced flow inside the intermediate space. In this case, it is essentially proposed to deliver fluid outside the annular space from one point of the annular space to another point of the annular space, as a result of which a compensating flow is induced inside the annular space. As assistance in this case, it is proposed to deliver comparatively cool fluid from the casing bottom part into the casing top part, or vice versa, in order to additionally utilize the differences in density for driving the convection flow. It may be stated that in DE 507 129 and WO 00/11324 the drive forces for the flow only act indirectly, as mentioned, in the form of the compensating flow. Furthermore, DE 507 129 and also WO 00/11324 do not suggest how the flow can be specifically set in a directional manner.

SUMMARY OF THE INVENTION

The invention specifies a turbomachine of the type mentioned at the beginning which enables a flow for avoiding the damaging thermal stratification to be imposed on the fluid contained inside a cavity.

The essence of the invention is therefore for means which are suitable for specifically imposing a forced and preferably directional convection with a predominant circumferential component on the fluid inside a cavity directly in the cavity itself. The cavity in this case is formed in particular between an inner casing and an outer casing of the turbomachine, thus, for example, between a combustor wall and an outer casing of a gas turbine. In this case, the cavity is designed with an essentially annular cross section, in particular as a torus, or with a cross section in the shape of a ring segment. On account of the high thermal loading during operation of the turbomachine, it is advantageous if the means for driving the flow have no movable parts. The direct use of blowers, fans and devices of that kind having movable parts is therefore advantageously to be avoided inside the cavity for driving the convection flow. At least one ejector which can be operated with a motive fluid is preferably provided inside the cavity. Within the scope of the invention, an ejector may readily also be, for example, a tangentially oriented hole which is arranged in a casing wall and which is able to introduce a directional flow into the cavity. Ejectors require only a small mass flow of motive fluid in order to drive and maintain a flow sufficient for the intended purpose at, for example, 8 m/s to 20 m/s inside the cavity. This limiting of the mass flow of the motive medium is important especially when existing auxiliary systems are to be utilized for driving the flow, these auxiliary systems delivering cold fluid, for example external air, into the cavity. Furthermore, the ejectors have the advantage of being able to set a directional circulating flow in such a way that, in addition to the predominant circumferential component, an axial component is also imposed on the flow brought about. This has the further advantage that axial temperature differences in axially extended cavities can also be evened out.

In a preferred embodiment of the invention, the cavity is provided with an extraction point which is connected to the ejector via a blower which can be arranged outside the region of high thermal loading. This blower delivers a motive fluid in a closed circuit from the extraction point to the ejector. The temperature gradient of a turbine casing can therefore be markedly reduced, which also improves the safety and reliability of a warm start possibly to be realized.

In a further preferred embodiment of the invention, an ejector is arranged at a point of the cavity which is situated at the furthest top or bottom geodetic level, whereas the extraction point connected to this ejector is arranged at point of the cavity which is situated at an opposite level, that is to say at the furthest top or furthest bottom level. In this way, the difference in density between the motive fluid issuing from the ejector and the medium in the cavity is at a maximum at the issuing point in such a way that the natural convection acts in an assisting manner and contributes in a certain manner to self-regulation of the temperature distribution: as soon as a thermal stratification of a few degrees occurs, the drive force of the ejector is intensified by the differences in density. If, conversely, the temperature is made more uniform, the intensification is slight or disappears entirely.

If the cavity has an annular cross section, means for exciting and maintaining the through flow are preferably configured and arranged in such a way that the flow is inclined in the axial direction relative to the circumferential direction by less than 30°, in particular preferably less than 10°. Thus ejectors are preferably oriented with their blowout direction essentially in the circumferential direction. A setting of up to about 30° in the axial direction can possibly result in advantages, since in this way, in an axially extended cavity, the axial temperature distribution is also made more uniform. In particular, it is advantageous with regard to the intensity of the flow excitation if two or more ejectors oriented in the same blowout direction are arranged equidistantly at the circumference of the cavity. If these ejectors are arranged in the closed circuit as described, it is also advantageous to place the extraction point, assigned to an ejector, of the cavity, relative to the blowout direction of an ejector, directly upstream of an ejector arranged at another circumferential position. In this case, it can again be advantageous to arrange the extraction point at a different axial position from the ejector assigned to said extraction point; this measure is also perfectly suitable for helping to make the temperatures more uniform.

When the turbomachine is at rest, in particular during a cooling phase following a shutdown, a flow is forced in the cavity, this flow counteracting the generation of a pronounced thermal stratification. The circumferential velocity of the tangential flow is in this case preferably within a range of 8 m/s to 20 m/s. This velocity range has proved to be especially favorable in order to achieve sufficient intensity of the temperature compensation on the one hand and to avoid the generation of potentially counterproductive turbulence and secondary flows on the other hand. In this case, the mass flow of the fluid delivered by the ejectors is advantageously below 2 kg/s; a range between 0.5 kg/s and 1.25 kg/s is to be preferred here. In annular cavities, a circumferential flow or a helical flow is preferably excited. The helix angle of the helical flow is preferably less than 30°, preferably less than 10°.

In a development of the invention, the cavity has openings for drawing off fluid, through which openings fluid can flow off from the cavity. This is especially advantageous when fluid is fed from outside into the cavity, for example for driving the tangential flow. The openings are preferably arranged symmetrically at the circumference, for example in the form of an annular gap, ring-segment-shaped gaps, or holes distributed at the circumference. The openings are fluidically connected, for example, to the hot-gas path of a gas turbine, so that fluid located in the cavity, which fluid is displaced by the feeding of fresh fluid, can flow off into the hot-gas path. In this connection, "hot-gas path" refers to the entire flow path from the inlet into the turbine guide row right up to the exhaust-gas diffuser.

BRIEF DESCRIPTION OF THE DRAWINGS

The invention is to be explained in more detail below with reference to the drawings. Of course, the following figures represent only illustrative examples and are not nearly able to represent all those embodiments of the invention, as is characterized in the claims, which are revealed to the person skilled in the art.

DETAILED DESCRIPTION OF THE PREFERRED EMBODIMENTS

Figure 1:
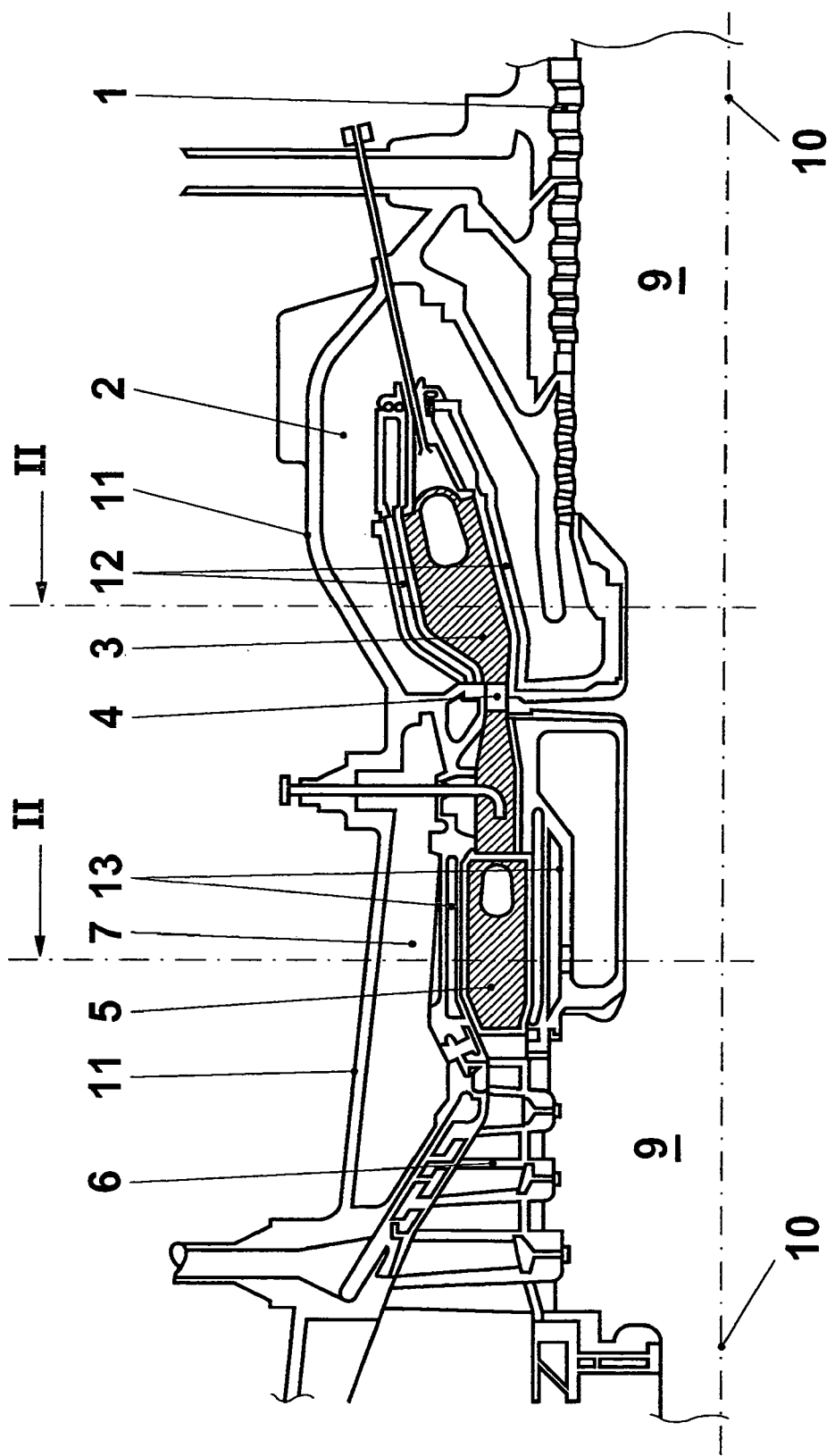
FIG. 1 shows part of the thermal block of a gas turbine.

The invention is to be explained in the context of a turbomachine. The thermal block of a gas turbine is illustrated in FIG. 1, only the part above the machine axis 10 being shown. The machine shown in FIG. 1 is a gas turbine having "sequential combustion", as disclosed, for example, by EP 620362. Although its functioning is not of primary significance for the invention, this may be explained in broad outline for the sake of completeness. A compressor 1 draws in an air mass flow and compresses it to a working pressure. The compressed air flows through a plenum 2 into a first combustor 3. A fuel quantity is introduced there and burned in the air. The hot gas produced is partly expanded in a first turbine 4 and flows into a second combustor 5, an "SEV combustor". The fuel supplied there ignites on account of the still high temperature of the partly expanded hot gas. The reheated hot gas is expanded further in a second turbine 6, in the course of which mechanical output is transmitted to the shaft 9. During operation, temperatures of several 100° C. already prevail in the last compressor stages, and even more so in the region of the combustors 3, 5 and in the turbines 4, 6. After such a machine has been shut down, the large masses—for example a mass of the rotor 9 of 80 tonnes—store a large quantity of heat for a prolonged period of time. At least in the conventional setup of a gas turbine having a horizontal machine axis, during the cooling when the machine is at rest, a pronounced vertical thermal stratification occurs in the flow cross sections of the machine. This leads to the top and bottom parts of casing and rotor cooling down at different rates, as a result of which distortion of the components occurs, which is referred to as "buckling".

Figure 2:
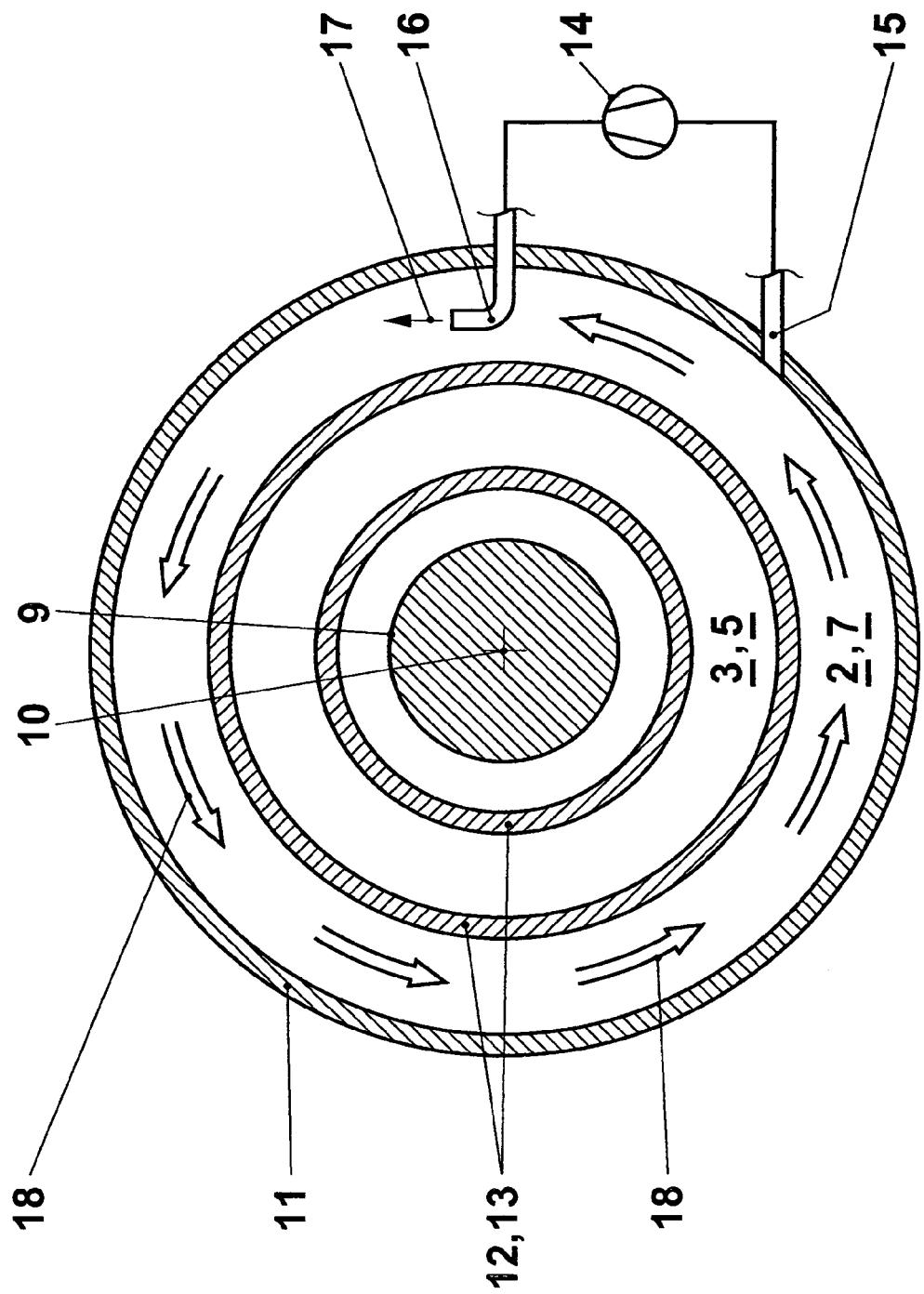
FIG. 2 shows a first example for the design according to the invention of the gas turbine from FIG. 1 in cross section.

In the gas turbine shown as an example, the invention is realized in each case in the region of the cavities 2, 7 surrounding the combustors 3, 5. The cross-sectional representation in FIG. 2 is highly schematic and could constitute a section both in the region of the first combustor 3 and in the region of the second combustor 5. In each case an annular cavity 2, 7 is formed between an outer casing 11 of the gas turbine and a combustor wall 12, 13, which may also be referred to as inner casing. After the machine has been shut down, a considerable portion of heat which is stored in the structures 9, 12, 13 is dissipated via the outer casing 11. On account of differences in density, fluid in the cavities 2, 7 tends to build up the stable thermal stratification mentioned, the avoidance of which is of course the object of the invention. In the example shown, for the embodiment of the invention, the outer casing is provided with an extraction point 15 which is connected to the suction side of a blower 14. The pressure side of the blower 14 is connected to an ejector 16, which is arranged in order to introduce a motive fluid into the annular cavity in the tangential direction. In this case, the motive-fluid flow 17 is sufficiently dimensioned—typically in the region of 1 kg/s per ejector—in order to excite and maintain a circumferential flow (indicated by arrows 18) which avoids the generation of the thermal stratification. In the embodiment of the invention, the blower 14 can be advantageously arranged at a distance from the actual point at which the drive force is applied, here in particular from the thermal block of the gas turbine, so that in particular the drive motor is protected from excessive thermal loading. Furthermore, it is possible to arrange shutoff members (not shown) in the connecting lines from the blower 14 to the extraction point 15 and to the ejector 16; this enables the blower to be isolated from hot gas and possibly aggressive combustion products in the cavity 2, 7 during operation of the turbomachine and enables the flow path to be opened for driving the ejector motive-fluid flow 17 only after shutdown of the turbomachine.

Figure 3:
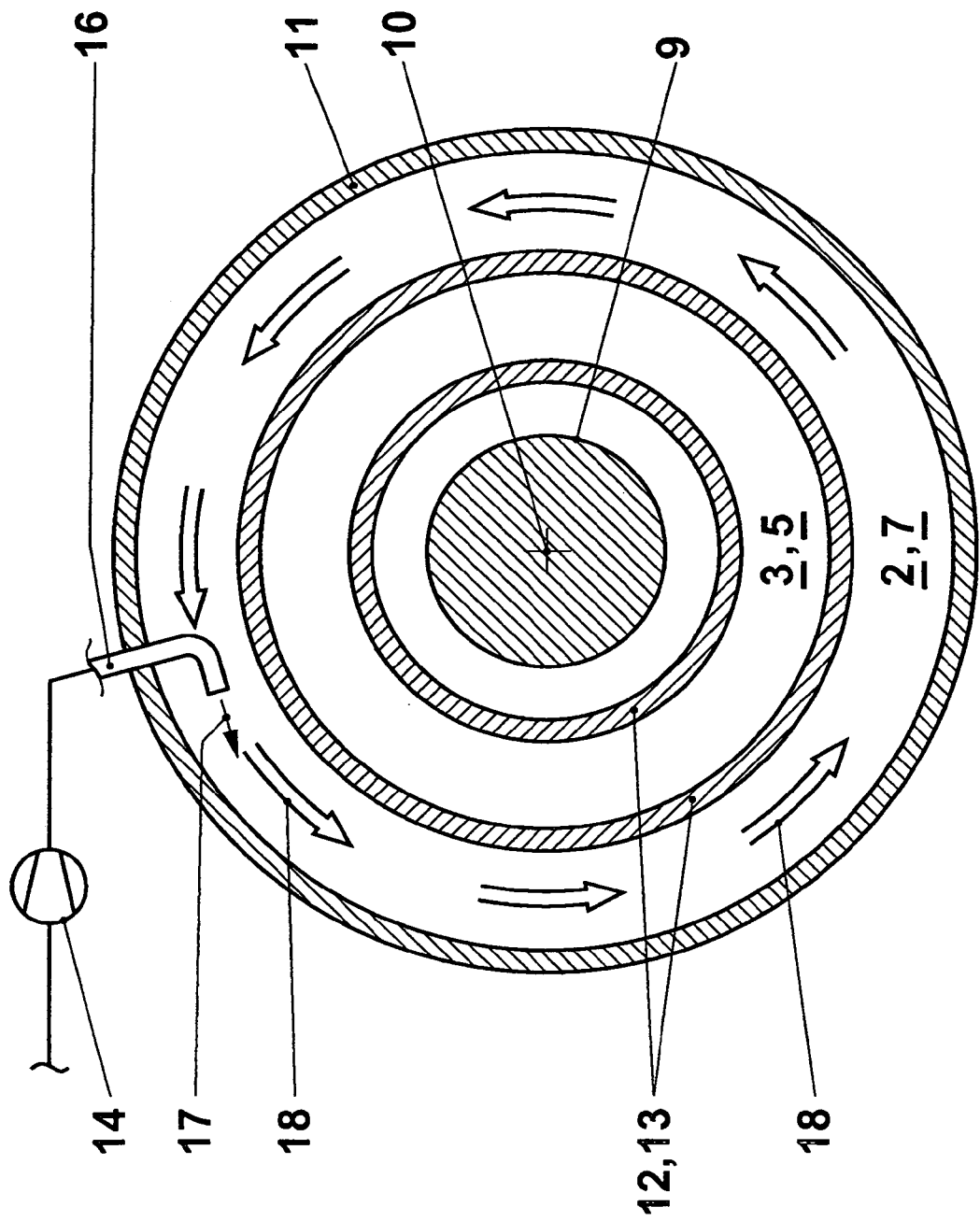
FIG. 3 shows a simplified variant of the design according to the invention of the gas turbine.

It is of course also possible for the motive fluid 17 of the ejector 16 to be delivered from outside by a blower 14, as indicated in FIG. 3. On the premise that the motive fluid 17 is ambient air, which has a lower temperature and thus a higher density than the fluid contained in the cavity 2, 7, the ejector 16 is advantageously arranged at that point of the annular cavity 2, 7 which is situated at the highest geodetic level. The difference in density between motive fluid and fluid to be driven then additionally intensifies the flow excitation of the motive fluid 17 flowing out of the ejector 16. A nonreturn or shutoff element is preferably arranged between blower 14 and ejector 16 in such a way that an outflow of hot gas is prevented during operation of the turbomachine. An advantage of this open embodiment can be seen in the fact that thermal loading of the blower 14 can be completely avoided if the latter delivers, for example, fresh air. A further advantage is that auxiliary systems possibly present, for instance a compressed-air system which is present anyway, can easily be adapted for delivering the motive fluid in such a way that the blower 14 can possibly be completely dispensed with. In order to avoid thermal shocks, the motive fluid delivered to the ejector can be directed via heat-exchanger surfaces, for example through or via hot structures of the machine itself, prior to being directed to the ejector 16, or a blower 14 can be connected on the suction side to other casing cavities.

Figure 4:
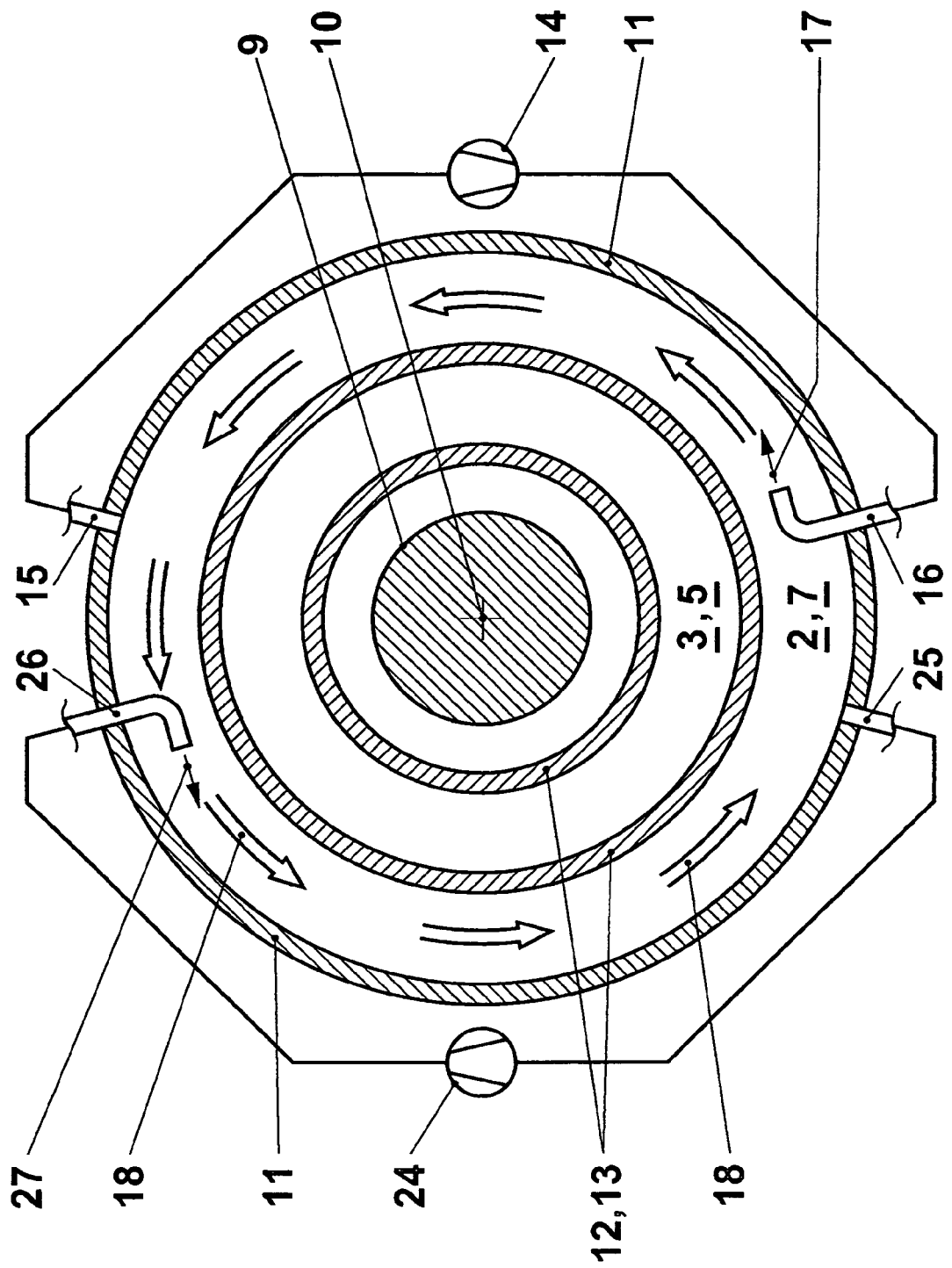
FIG. 4 shows a preferred embodiment of the invention.

A further advantageous embodiment is shown in FIG. 4. In an axial position, two ejectors 16, 26 oriented in the same blowout direction—counterclockwise in the example—are arranged at the circumference, a first ejector 16 being arranged at point of a cavity 2, 7 situated at the lowest geodetic level and a second ejector 26 being arranged at a point of a cavity 2, 7 situated at the highest geodetic level. A blower 14 is connected on the pressure side to the first ejector 16 and delivers its motive fluid 17 to the ejector 16 from an extraction point 15 situated upstream of the second ejector 26 relative to the blowout direction of the ejectors. A second blower 24 is connected on the pressure side to the second ejector 26 and delivers its motive fluid 27 to the ejector 26 from an extraction point 25 situated upstream of the first ejector 16 relative to the blowout direction of the ejectors. The motive-fluid flows 17, 27 flowing out counterclockwise excite a flow 18 through the cavity, this flow 18 being oriented in the same direction of rotation. The ejectors or their motive-fluid flow are/is to be designed in such a way that the velocity of the circumferential flow 18 is within the range of about 8 m/s to 20 m/s. Furthermore, the arrangement of ejectors and extraction points, assigned to them, at geodetically opposite positions results in a type of self-regulation of the throughflow intensity: if a slight vertical thermal stratification occurs, warm motive fluid 17 is delivered from the extraction point 15 to a point lying geodetically at the bottom. A lifting force of the motive fluid 17 therefore additionally occurs in the right-hand casing half. At the same time, cold fluid is delivered from the extraction point 25 to the ejector 26 arranged at the top. As a result, a downward flow of the motive fluid 27 therefore occurs in the left-hand casing half. This natural convection of the motive fluid accordingly assists the excitation of the flow 18, and in fact all the more so, the greater a temperature difference is between the casing top half and the casing bottom part.

Figure 5:
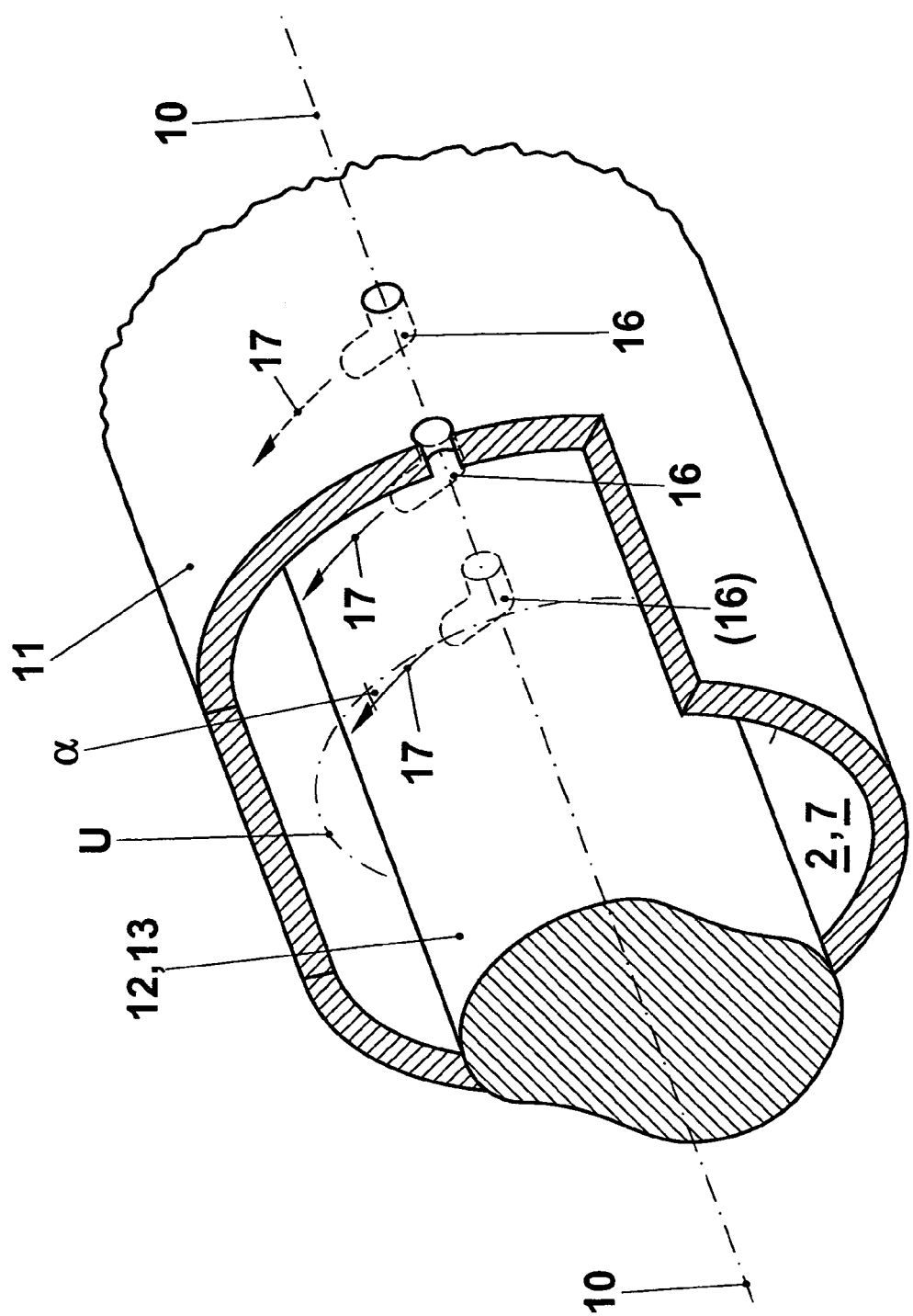
FIG. 5 shows a further preferred variant of the invention.

A perspective representation of an annular cavity is shown in FIG. 5. The inner boundary 12, 13 is only shown schematically as a solid cylinder. A cavity 2, 7 is formed between this inner boundary and an outer shell 11. Distributed in the axial direction, three ejectors 16 which cannot actually be seen in the representation are passed through the outer shell 11 and are indicated schematically by broken lines. The ejectors are arranged in such a way that the orientation of the blowout direction of the motive fluid is inclined axially at an angle $\alpha$ to the circumferential direction indicated by a dashed line U. In order to excite the circumferential flow primarily intended, this setting angle $\alpha$ may be restricted to values of less than 30°, in particular to values of less than 10°. A helical flow (not shown) through the cavity consequently occurs, which furthermore helps to avoid an axial temperature gradient which possibly occurs. A further substantial advantage of the invention which is not known from the prior art can be seen in the possibility of exciting a directional flow.

The invention is in no way restricted to use in the cavities 2, 7 lying furthest on the outside. Given a suitable design of the means which excite and maintain the convection flow, these means may likewise be realized in the combustors 3, 5 or in the space formed between the casing elements 12, 13 and the shaft 9.

Figure 6:
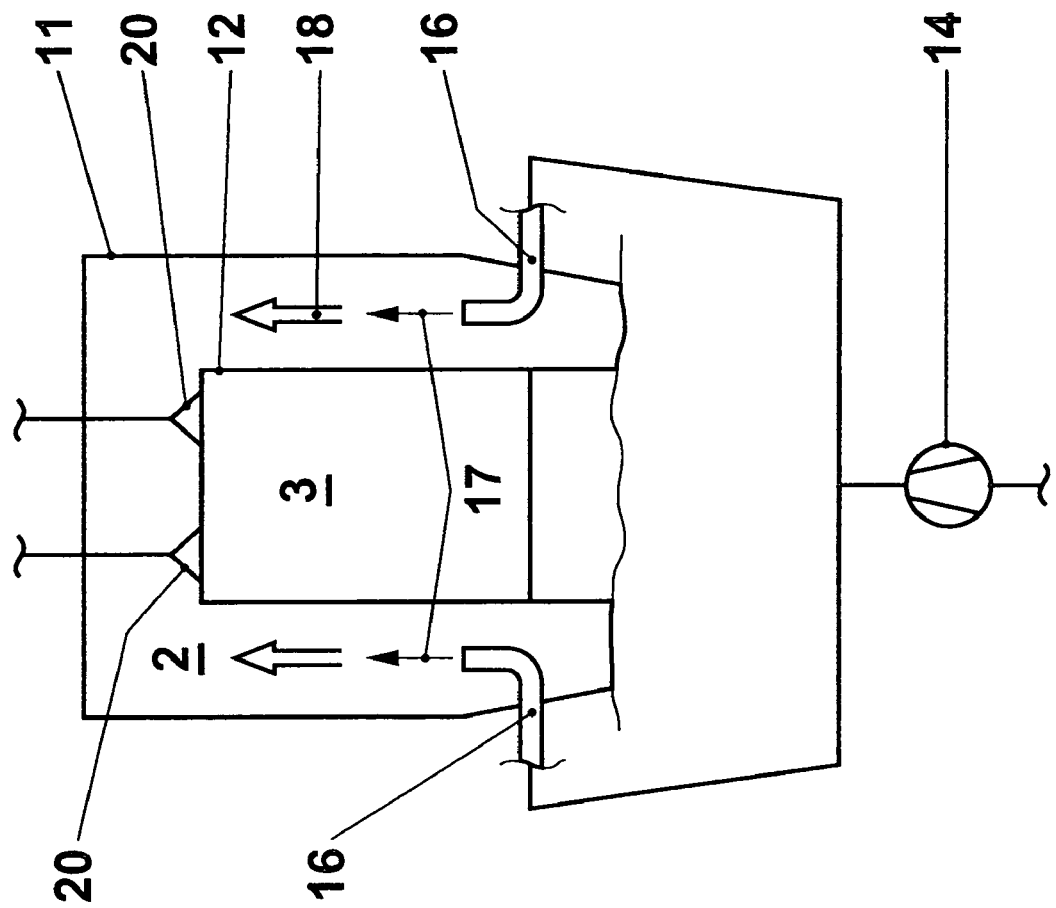
FIG. 6 shows an arrangement utilizing the principles of the invention at a non-annular cavity.

FIG. 6 shows a circulation arrangement analogous to the invention, taking a silo combustor of a gas turbine as an example. The combustor 3 is defined by a combustor wall 12 which is surrounded by a cavity 2, through which the compressed air flows during operation to the premix burners 20 and from there into the combustor 3.

Ejectors 16, which are connected to the blower 14, are passed through the outer casing; when the gas turbine is at rest, the blower 14 delivers a flow of motive fluid 17 through the ejectors 16, which force convection 18 in the cavity 2, as a result of which the temperature distribution is made more uniform. In a comparable manner, analogous modifications of the invention in the most diverse geometries may be used.

An additional advantage of the invention may be seen in the fact that it does not have to rely on a movement of the rotor. Even if the rotor should be jammed for any reasons whatsoever, or if a shaft-turning or shaft-indexing arrangement fails, the buckling of the casing can be prevented or at least markedly reduced by means of the invention.

Pressure waves may also be used in a manner known per se for driving the flow in the cavities themselves, or an ejector may be used for driving the motive-fluid flow instead of a blower.

The person skilled in the art will readily recognize that the use of the invention is in no way restricted to gas turbines but that the invention may be used in a multiplicity of further applications. Of course, the use of the invention is also not restricted to a gas turbine shown in FIG. 1 and having sequential combustion, but rather the invention may also be used in gas turbines having only one combustor or more than two combustors. In particular, the invention may also be realized in steam turbines.

What is claimed is:

1. A turbomachine comprising:
   at least one cavity having a cross-section with a shape selected from the group consisting of an annular shape and a ring-segment-shape; and
   at least one means for inducing and maintaining a forced flow with at least a tangentially oriented velocity component, the means being arranged inside the cavity and the means comprising:
      a first ejector disposed proximate a lowest geodetic level of the cavity and a first extraction point disposed proximate a highest geodetic level of the cavity, the first ejector delivering motive fluid extracted from the cavity at the first extraction point;
      a second ejector disposed proximate the highest geodetic level of the cavity and a second extraction point disposed proximate the lowest geodetic level of the cavity, the second ejector delivering motive fluid extracted from the cavity at the second extraction point;
   wherein the first extraction point is disposed upstream of the second ejector relative to blowout direction thereof, the second extraction point is disposed upstream of the first ejector relative to blowout direction thereof, and wherein the blowout directions are oriented such that at least a portion of outflow impulse is oriented in a circumferential direction of the cavity.

2. The turbomachine of claim 1, wherein the means are configured and arranged to induce a forced flow that is inclined in an axial direction relative to a circumferential direction by an inclination angle of less than 30°.

3. The turbomachine of claim 2, wherein the inclination angle is less than 10°.

4. The turbomachine of claim 1, wherein at the first and second are arranged equidistantly in the circumferential direction of the cavity.

5. The turbomachine of claim 1, wherein the first extraction point is in fluid communication with a suction side of a fan, and a pressure side of said fan is in fluid communication with the first ejector.

6. The turbomachine of claim 1, wherein the cavity is formed between an inner casing and an outer casing of the turbomachine.

7. The turbomachine of claim 6, wherein the inner casing is selected from the group consisting of a combustor plenum and a combustor wall of a gas turbine, and wherein the outer casing is an outer shell of the gas turbine.

8. The turbomachine of claim 1, further comprising openings for drawing off fluid from the cavity and disposed at circumferentially symmetrical positions in the cavity.

9. The turbomachine of claim 8, wherein the openings are selected from the group consisting of an annular gap, a plurality of ring-segment-shaped gaps, holes, and combinations thereof, and wherein the openings are disposed in a circumferentially symmetrical manner.

10. The turbomachine of claim 8, wherein the openings are in fluid communication with a hot-gas path of a gas turbine.

11. A method for operating a turbomachine comprising at least one cavity having a cross-section with a shape selected from the group consisting of an annular shape and a ring-segment-shape, and at least one means for inducing and maintaining a forced flow with at least a tangentially oriented velocity component, the means being arranged inside the cavity, the method comprising:
   forcing a flow through the cavity at standstill of the turbomachine by a motive fluid, the flow being tangentially oriented at least with one velocity component, wherein:
      a first ejector delivers motive fluid extracted from the cavity at a first extraction point with the first ejector being disposed proximate a lowest geodetic level of the cavity and the first extraction point being disposed proximate a highest geodetic level of the cavity;
      a second ejector delivers motive fluid extracted from the cavity at a second extraction point with the second ejector being disposed proximate the highest geodetic level of the cavity and the second extraction point being disposed proximate the lowest geodetic level of the cavity;
      the first extraction point is disposed upstream of the second ejector relative to blowout direction thereof, and the second extraction point is disposed upstream of the first ejector relative to blowout direction thereof;
      motive fluid delivered by the first ejector has a higher temperature than motive fluid delivered by the second ejector; and
      the blowout directions are oriented such that at least a portion of outflow impulse is oriented in a circumferential direction of the cavity.

12. The method of claim 11, further comprising shutting down the turbomachine, and forcing the flow during a cooling period following shutdown.

13. The method of claim 11, further comprising discharging fluid into a hot-gas path of a gas turbine through openings.

14. The method of claim 11, wherein a closed volume of motive fluid essentially is circulated by the ejectors.

15. The method of claim 11, wherein the flow is a circumferential flow.

16. The method of claim 11, wherein the flow is a helical flow with a helix angle less than 30°.

17. The method of claim 16, wherein the helix angle is less than 10°.

18. A turbomachine comprising:
   at least one cavity having a cross-section with a shape selected from the group consisting of an annular shape and a ring-segment-shape;
   first and second ejectors for inducing and maintaining a forced flow with at least a tangentially oriented velocity component, the first and second ejectors being arranged inside the cavity and being operable with a motive fluid;
   wherein the first ejector is disposed proximate a lowest geodetic level of the cavity and a first extraction point is disposed proximate a highest geodetic level of the cavity, the first ejector delivering motive fluid extracted from the cavity at the first extraction point;
   wherein the second ejector is disposed proximate the highest geodetic level of the cavity and a second extraction point is disposed proximate the lowest geodetic level of the cavity, the second ejector delivering motive fluid extracted from the cavity at the second extraction point;
   wherein the first extraction point is disposed upstream of the second ejector relative to blowout direction thereof, and the second extraction point is disposed upstream of the first ejector relative to blowout direction thereof; and wherein the blowout directions are oriented such that at least a portion of outflow impulse is oriented in a circumferential direction of the cavity.

19. A method for operating a turbomachine comprising at least one cavity having a cross-section with a shape selected from the group consisting of an annular shape, and a ring-segment-shape, first and second ejectors for inducing and maintaining a forced flow with at least a tangentially oriented velocity component, the first and second ejectors being arranged inside the cavity, the method comprising:

forcing a flow through the cavity at standstill of the turbomachine by a motive fluid emerging from the first and second ejectors, the flow being tangentially oriented at least with one velocity component, wherein:

the first ejector delivers motive fluid extracted from the cavity at a first extraction point with the first ejector being disposed proximate a lowest geodetic level of the cavity and the first extraction point being disposed proximate a highest geodetic level of the cavity;

the second ejector delivers motive fluid extracted from the cavity at a second extraction point with the second ejector being disposed proximate the highest geodetic level of the cavity and the second extraction point being disposed proximate the lowest geodetic level of the cavity;

the first extraction point is disposed upstream of the second ejector relative to blowout direction thereof, and the second extraction point is disposed upstream of the first ejector relative to blowout direction thereof;

motive fluid delivered by the first ejector has a higher temperature than motive fluid delivered by the second ejector; and the blowout directions are oriented such that at least a portion of outflow impulse is oriented in a circumferential direction of the cavity.

* * * * *

UNITED STATES PATENT AND TRADEMARK OFFICE
CERTIFICATE OF CORRECTION

| | |
|---|---|
| PATENT NO. | : 7,329,084 B2 |
| APPLICATION NO. | : 10/830028 |
| DATED | : February 12, 2008 |
| INVENTOR(S) | : Dittmann et al. |

It is certified that error appears in the above-identified patent and that said Letters Patent is hereby corrected as shown below:

In claim 19, Col. 9, lines 6-7, replace "shape, and a ring-segment-shape, first" with --shape and a ring-segment-shape, and first--.

Signed and Sealed this

Twenty-sixth Day of August, 2008

JON W. DUDAS
*Director of the United States Patent and Trademark Office*